(No Model.)
C. F. BEERS.
SPECTACLES AND EYEGLASSES.
No. 271,771. Patented Feb. 6, 1883.
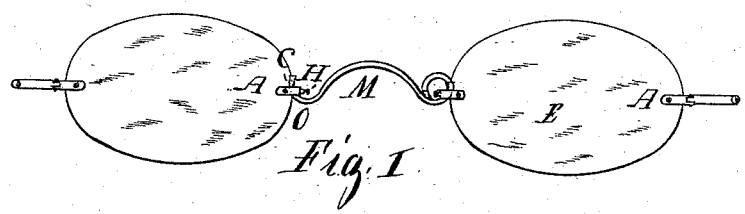
Fig. 1
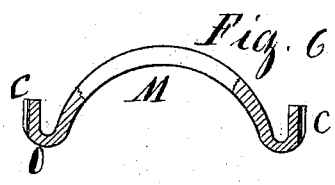
Fig. 6
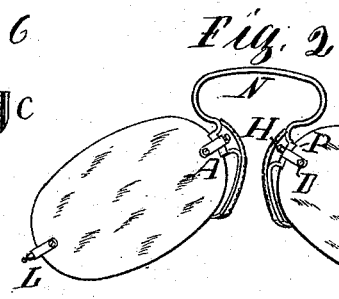
Fig. 2
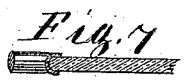
Fig. 7
Fig. 10, Fig. 11
Fig. 3
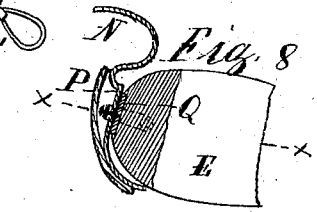
Fig. 8
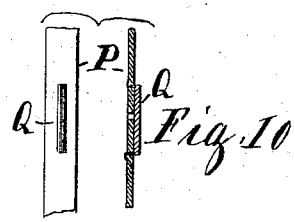
Fig. 12
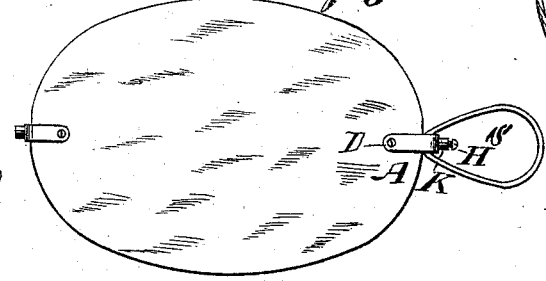
Fig. 4, Fig. 9
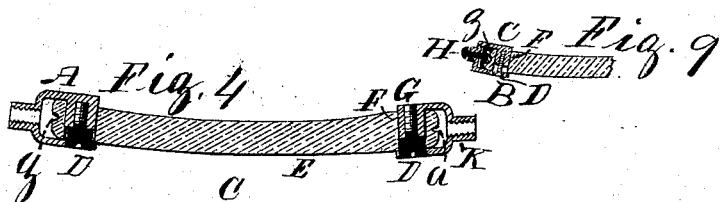
Fig. 5
Fig. 13
Witnesses
John C. Tunbridge
T. W. Morrison
Inventor:
Charles F. Beers
By Horace Harris
Atty

UNITED STATES PATENT OFFICE.

CHARLES F. BEERS, OF NEWARK, NEW JERSEY.

SPECTACLES AND EYEGLASSES.

SPECIFICATION forming part of Letters Patent No. 271,771, dated February 6, 1883.

Application filed May 16, 1882. (No model.)

*To all whom it may concern:*

Be it known that I, CHARLES F. BEERS, of Newark, in the county of Essex and State of New Jersey, have invented a new and useful Improvement in Spectacles and Eyeglasses, of which the following is a specification.

My invention relates to an improvement in frameless eyeglasses and spectacles; and it consists in the devices for uniting the spring or nose-piece and other parts to the glass, and in the devices for folding the eyeglasses when not required for use.

Figure 1 is a face view of spectacles. Fig. 2 is the same of eyeglasses. Fig. 3 is an enlarged view of one glass, showing a handle attached. Fig. 4 is an enlarged longitudinal view of a glass and clips. Fig. 5 is an enlarged view of the clip. Fig. 6 is a detailed view of the nose-piece of spectacles. Fig. 7 is a further detailed view. Fig. 8 shows a modification having a rib on the spring. Fig. 9 is a longitudinal section through Fig. 8 on a line of $x\ x$. Fig. 10 gives detailed views of parts as seen in Fig. 8. Fig. 11 is an end view of part shown in Fig. 6. Fig. 12 is a detailed view of the handle. Fig. 13 shows the improvement in jointing the springs for eyeglasses.

In my construction I unite the nose-piece in spectacles and the spring in eyeglasses, as well as the handle, &c., by means of a clip, A, having two prongs, B C, fitted to slip onto the end of a glass and be held in position by the shoulder-screw D, passing through a hole in the glass E. This hole may be square, round, three-cornered, or oval.

To provide for glasses of different thickness, I make the prong C with a flange, F, on the inside, which is screw-threaded to receive the screw D. The prong B is countersunk to receive the head of the screw.

The clip, made of any suitable elastic metal, will widen and contract to the thickness of the glass to be used, and the screw working in the flange-nut F will hold the two parts of the clip together closely to any thickness of glass, and the bearing in the nut F being so long, the end of the screw may stop short of the outside of the prong, as seen in Figs. 4 and 5. However, this nut F may be tapped clear through, if desired, as seen at G in Fig. 4.

In the outer end of the clip is a screw, H, in the screw-threaded shank K of the clip, and this screw has a point fitted to enter a >-shaped recess, A, in the edge and hold the clip from moving either way along the edge of the glass. This is found to be sufficient alone for the locking-piece L; but in uniting the nose-piece M of spectacles and the spring N of eyeglasses I prepare the end of the glass with a square-cut, semicircular, or >-shaped groove, $g$, lying parallel with the faces of the glass; and the end O of the nose-piece for spectacles and the portion P of the spring N for eyeglasses are prepared with a corresponding shaped section, C, to fit into said groove in the glass. This part of the spring or nose-piece is then put through the clip under the end of the screw H, and the screw is turned in, the point entering a recess in the spring, &c., like the recess $a$ in the glass. This screw holds the nose-piece or spring firmly to the glass; or, in place of the spring being made to fit in the groove in the glass, a strip, Q, (see Figs. 8 and 10,) may be secured to the spring having the desired shape to fit in the groove $g$ in the glass. The handle S is also united the same as the spring, &c. (See Fig. 3.)

Instead of the glasses in eyeglasses being closed or shut up by bending up the spring and sliding the glasses one on the face of the other, in the usual way, I make my spring N in two pieces, as seen in Fig. 13, and joint them together on the pin R, and then fold the glasses upon each other, doubling them up by moving the parts on the pin R, and in this way I avoid the strain and great liability to break in the former method.

On the inner side, near each end of the spring held by the pin R, is a small dent, $e$, fitted to receive the projection $i$ on the opposite piece, which, when the glasses are open or shut up, will lock the springs in position. This becomes a valuable improvement on the method of folding up the glasses for a case.

I claim—

1. In spectacles and eyeglasses, the clip A, having the flange-nut F, in combination with the screw D, substantially as and for the purpose specified.

2. The combination of the clip A, screw D, glass E, and screw H, substantially as and for the purpose set forth.

3. In combination with the clip A, screw D, glass E, and screw H, the nose-piece M or spring N, said parts having the sections O and P, fitted to enter the groove $g$ in the edge of the glass, substantially as and for the purpose named.

CHARLES F. BEERS.

Witnesses:
HORACE HARRIS,
R. S. STEADMAN.